United States Patent
Glick et al.

(10) Patent No.: US 10,743,170 B1
(45) Date of Patent: Aug. 11, 2020

(54) DEVICE, SYSTEM AND METHOD FOR EMERGENCY AUDIO TRANSMISSION

(71) Applicant: MOTOROLA SOLUTIONS, INC., Chicago, IL (US)

(72) Inventors: Mordechai Glick, Petah Tikva (IL); Gabriel Bitton, Irus (IL); Nissim Gean, Netanya (IL); Alexander Massover, BatHefer (IL); Sapir Blutman, Eilat (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/699,022

(22) Filed: Nov. 28, 2019

(51) Int. Cl.
| | | |
|---|---|---|
| *H04W 4/90* | (2018.01) | |
| *H04W 4/10* | (2009.01) | |
| *H04W 76/45* | (2018.01) | |
| *H04W 60/00* | (2009.01) | |
| *H04W 4/16* | (2009.01) | |
| *H04W 4/80* | (2018.01) | |
| *H04W 4/08* | (2009.01) | |

(52) U.S. Cl.
CPC ............ *H04W 4/90* (2018.02); *H04W 4/08* (2013.01); *H04W 4/10* (2013.01); *H04W 4/16* (2013.01); *H04W 4/80* (2018.02); *H04W 60/00* (2013.01); *H04W 76/45* (2018.02)

(58) Field of Classification Search
CPC ........... H04W 4/90; H04W 4/80; H04W 4/08; H04W 4/10; H04W 4/16; H04W 60/00; H04W 76/40; H04W 76/45; H04W 76/50
See application file for complete search history.

(56) References Cited

U.S. PATENT DOCUMENTS

| | | | |
|---|---|---|---|
| 7,573,380 B2 | 8/2009 | Pinder | |
| 8,798,776 B2 | 8/2014 | Schildbach et al. | |
| 8,878,889 B1 * | 11/2014 | Kaupp | H04W 76/50 |
| | | | 348/14.02 |
| 9,307,370 B1 | 4/2016 | Pai et al. | |
| 9,510,165 B2 | 11/2016 | Patel et al. | |

(Continued)

FOREIGN PATENT DOCUMENTS

| | | |
|---|---|---|
| RU | 2008137126 A | 2/2007 |
| TW | 201320694 A1 | 5/2013 |

(Continued)

OTHER PUBLICATIONS

Mission Critical Push to Talk (MCPTT) Media Plane Control; Protocol Specification (3GGP TS 24.380 version 13.0.2 Release 13), ETSI TS 124 30 V13.0.2 (May 2016)—https://www.etsi.org/deliver/etsi_ts/124300_124399/124380/13.00.02_60/ts_124380v130002p.pdf.

*Primary Examiner* — Magdi Elhag
(74) *Attorney, Agent, or Firm* — Perry + Currier, Inc.

(57) ABSTRACT

A device, system and method for emergency audio transmission is provided. A server receives, over a broadband network, a request to make an emergency audio transmission to a talk group. The request is received from a first push-to-talk (PTT) device communicatively connected with the talk group over a narrow band network at which a second PTT device of the talk group has floor control. In response to granting the request, the server receives, from the first PTT device, an audio transmission over the broadband network, and transmits the audio transmission to the talk group via the broadband network.

20 Claims, 6 Drawing Sheets

(56) References Cited

U.S. PATENT DOCUMENTS

| | | | |
|---|---|---|---|
| 2006/0120516 A1 | 6/2006 | Armbruster et al. | |
| 2006/0142036 A1* | 6/2006 | Lim | H04W 4/10 |
| | | | 455/518 |
| 2010/0255826 A1* | 10/2010 | Brewer | H04W 4/10 |
| | | | 455/414.1 |
| 2011/0299429 A1* | 12/2011 | Tiwari | H04W 36/0022 |
| | | | 370/259 |
| 2011/0305188 A1* | 12/2011 | Bouwers | H04W 76/45 |
| | | | 370/315 |
| 2013/0165174 A1 | 6/2013 | Crockett | |
| 2015/0004927 A1* | 1/2015 | Mao | H04W 72/10 |
| | | | 455/404.2 |
| 2017/0132907 A1* | 5/2017 | Lee | G08B 21/02 |
| 2018/0077208 A1* | 3/2018 | Li | H04W 4/10 |
| 2018/0249302 A1 | 8/2018 | Pai et al. | |
| 2019/0372655 A1* | 12/2019 | Pinder | H04W 4/10 |

FOREIGN PATENT DOCUMENTS

| | | |
|---|---|---|
| WO | 2007082441 A1 | 7/2007 |
| WO | 2017140364 A1 | 8/2017 |

\* cited by examiner

DEVICE, SYSTEM AND METHOD FOR EMERGENCY AUDIO TRANSMISSION

BACKGROUND OF THE INVENTION

Law enforcement officers and other first responders may communicate with one another through talk groups using push-to-talk (PTT) devices connected over a narrow band network such as a land mobile radio (LMR) network. Talk groups enforce a system of floor control in which PTT devices are blocked from transmitting audio to a particular talk group when another PTT device which has higher priority is presently transmitting to the talk group. A PTT device which is presently transmitting to the talk group, and is thereby blocking others from transmitting, is said to have floor control. The enforcement of floor control helps to ensure that talk groups are not overwhelmed with excessive chatter from multiple PTT devices transmitting over one another.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
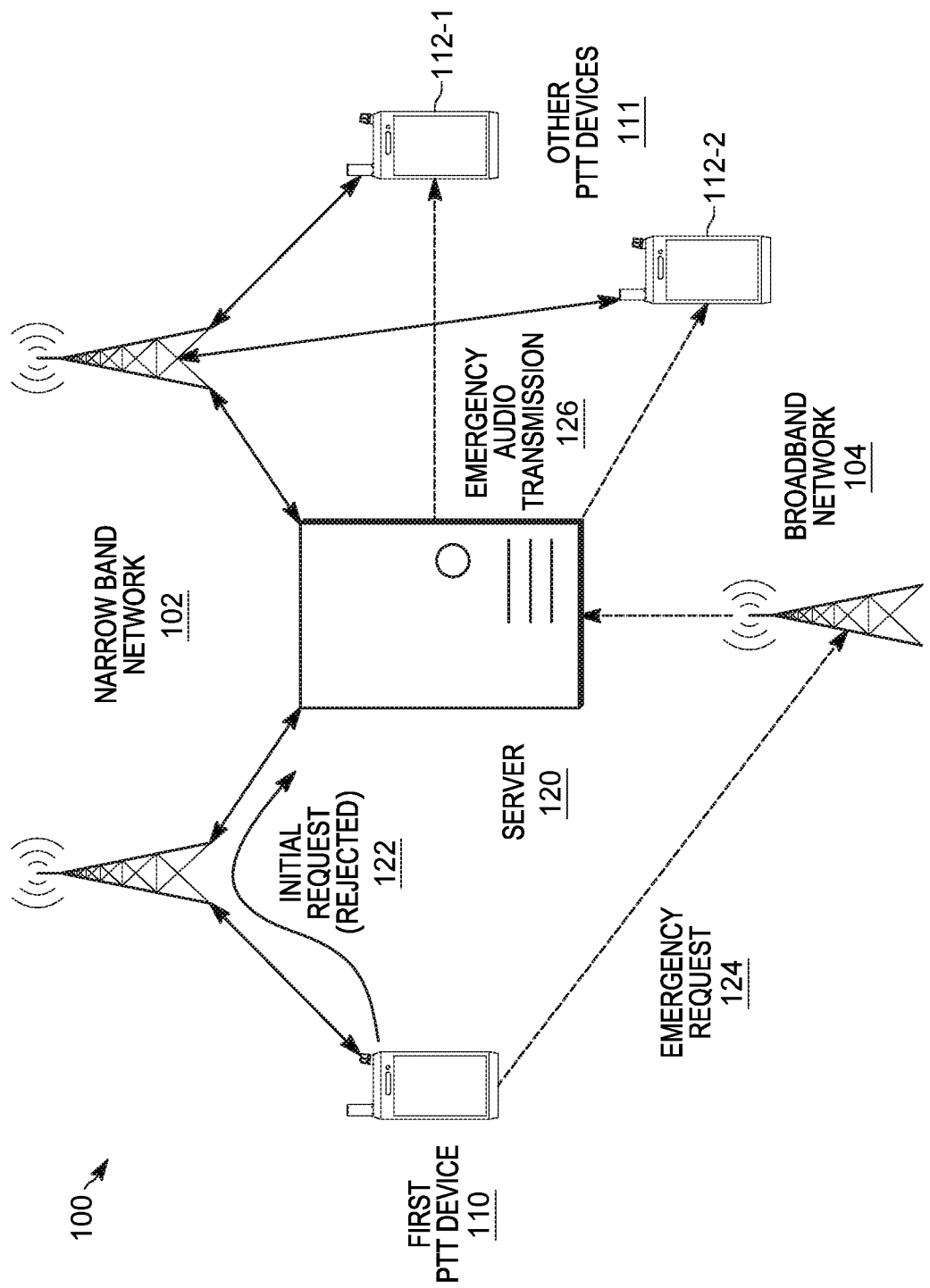
FIG. 1 is a system for emergency audio transmission, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The enforcement of floor control in talk groups helps to maintain an orderly communication platform in which transmissions from push-to-talk (PTT) devices controlled by may be clearly communicated one at a time. However, blocking PTT devices from transmitting to a talk group may have undesirable consequences, particularly in emergency situations. For example, when there is one PTT device maintaining floor control for an extended period of time, and there is another PTT device controlled by a user in an emergency who urgently wishes to call for help or otherwise transmit emergency information, the PTT device controlled by the user in the emergency situation may be blocked from doing so.

Thus, systems, methods, and devices are described herein which provide PTT devices in talk groups with the ability to make emergency transmissions while maintaining the benefits of an orderly communication platform that is provided by the aspect of floor control.

An aspect of the present specification provides a method for emergency audio transmission at a server. The method comprises: receiving, at a server, over a broadband network, a request to make an emergency audio transmission to a talk group, the request received from a first push-to-talk (PTT) device communicatively connected with the talk group over a narrow band network at which a second PTT device of the talk group has floor control; in response to granting the request, receiving, at the server, from the first PTT device, an audio transmission over the broadband network; and transmitting, from the server to the talk group, the audio transmission via the broadband network.

Another aspect of the present specification provides a method for emergency audio transmission at a PTT device. The method comprises: determining, at a push-to-talk (PTT) device communicatively connected to a talk group over a narrow band network, that the PTT device is in an emergency state; transmitting, from the PTT device to a server, a first request to communicate to the talk group over the narrow band network; receiving, at the PTT device, a rejection to communicate to the talk group over the narrow band network; transmitting, from the PTT device to the server, a second request to make an emergency audio transmission to the talk group over a broadband network; receiving, at the PTT device, permission to make the emergency audio transmission to the talk group over the broadband network; and transmitting, from the PTT device to the server, the emergency audio transmission over the broadband network.

Another aspect of the present specification provides a server for emergency audio transmission. The server comprises: a communication unit; and a controller configured to: receive, over a broadband network, a request to make an emergency audio transmission to a talk group, the request received from a first push-to-talk (PTT) device communicatively connected with the talk group over a narrow band network at which a second PTT device of the talk group has floor control; in response to granting the request, receive, from the first PTT device, an audio transmission over the broadband network; and transmit, to the talk group, the audio transmission via the broadband network.

Another aspect of the present specification provides a PTT device for emergency audio transmission. The PTT device comprises: a communication unit communicatively connected to a talk group over a narrow band network; and a controller configured to: determine that the PTT device is in an emergency state; transmit, to a server, a first request to communicate to the talk group over the narrow band network; receive a rejection to communicate to the talk group over the narrow band network; transmit, to the server, a second request to make an emergency audio transmission to the talk group over a broadband network; receive permission to make the emergency audio transmission to the talk group over the broadband network; and transmit, to the server, the emergency audio transmission over the broadband network.

Attention is directed to FIG. 1, which depicts an example system 100 for emergency audio transmission. The system 100 includes a narrow band network 102, such as a land mobile radio (LMR) network (and/or any other suitable network), over which a first push-to-talk (PTT) device 110 and other PTT devices 112 (including other PTT devices 112-1 and 112-2) are communicatively connected with a talk group.

The system 100 further includes a broadband network 104, such as a Long Term Evolution (LTE) network (and/or any other suitable network), over which the first PTT device 110 may make an emergency audio transmission 126 to the talk group. The system 100 includes a server 120 to facilitate such emergency audio transmissions, as discussed herein.

In operation, the first PTT device 110 makes an initial request 122 via the narrow band network 102 to make an audio transmission to the talk group. However, one of the other PTT devices 112 (e.g., the other PTT device 112-2) has floor control, and thus the initial request 122 to make an audio transmission is rejected. When the first PTT device 110 is in an emergency state (e.g. the user of the first PTT device 110 has pressed an emergency button), the first PTT device 110 then makes an emergency request 124 to make an emergency audio transmission 126 via the broadband network 104, which may be transmitted to the talk group, as discussed herein.

The server 120 is generally configured to receive, over the broadband network 104, a request 124 from the first PTT device 110 to make an emergency audio transmission 126 to a talk group. The server 120 determines whether to grant the request 124, as discussed herein. In response to granting the request 124, the controller of the server 120 receives, from the first PTT device 110, an emergency audio transmission 126 over the broadband network 104, and transmits, to the talk group, the emergency audio transmission 126 via the broadband network 104.

The first PTT device 110 is generally configured to determine that the first PTT device 110 is in an emergency state, for example, by receiving an input from an emergency button on the first PTT device 110, and/or by the detection of another trigger, as discussed herein. The first PTT device 110 is further generally configured to transmit, to the server 120, a first request 122 to communicate to the talk group over the narrow band network 102, and to receive a rejection to communicate to the talk group over the narrow band network 102. However, when in the emergency state, the first PTT device 110 is configured to transmit, to the server 120, a second request 124 to make an emergency audio transmission 126 to the talk group over the broadband network 104. When permitted, the first PTT device 110 is further configured to receive permission to make the emergency audio transmission 126 to the talk group over the broadband network 104, and to transmit, to the server 120, the emergency audio transmission 126 over the broadband network 104. The server 120 then transmits the emergency audio transmission 126 to the other PTT devices 112.

The emergency audio transmission 126 need not pre-empt the other PTT device 112-2 which currently has floor control, but rather, the emergency audio transmission 126 overrides floor control, and is received at the other PTT devices 112 irrespective of whether any other PTT device is currently transmitting. That is, the emergency audio transmission 126 overcomes (i.e., ignores) any priority rules that may operate in the talk group to determine whether any particular PTT device in the talk group may interrupt another over the narrow band network. Thus, a PTT device that has "low" priority in the talk group may be able to transmit audio despite a PTT device of a "higher" priority in the talk group transmitting.

When the emergency audio transmission 126 is transmitted while another PTT device with floor control is transmitting, both the emergency audio transmission 126 from the first PTT device 110 and the ordinary audio transmission from the other PTT device 112-2 that has floor control are outputted at the other PTT devices 112. Thus, despite the other PTT device 112-2 transmitting ordinary audio, the first PTT device 110 is permitted to make an emergency audio transmission 126, to convey an urgent message, such as when the user of the first PTT device 110 has been injured, or when there is an imminent threat for the user of the first PTT devices 110 to warn the users of the other PTT devices 112 about. It is to be understood that the other PTT device 112-2 that has floor control may not output either of the audio transmissions as the PTT device 112-2 is transmitting.

Thus, PTT devices may be communicatively coupled with a talk group that maintains the benefits of maintaining floor control over the narrow band network 102 while also being provided with an option for PTT devices to make emergency audio transmissions 126 over the broadband network 104. As discussed in greater detail below, the option to make the emergency audio transmission 126 may be restricted so as to encourage use of the option sparingly.

Figure 2:
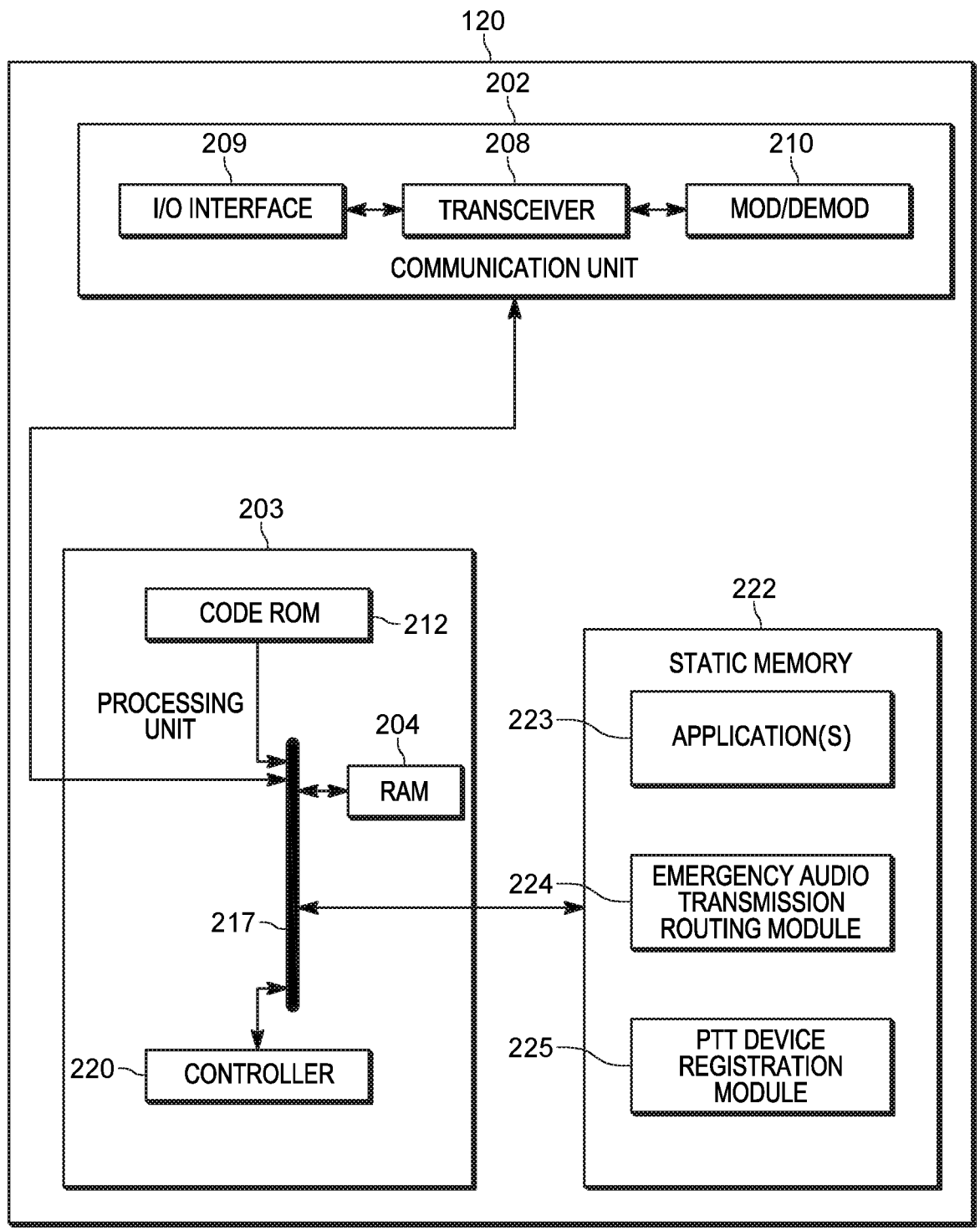
FIG. 2 is a device diagram showing a device structure of a server for emergency audio transmission, in accordance with some examples.

Attention is next directed to FIG. 2, which is a device diagram of an example of the server 120 of FIG. 1. In general, the server 120 may comprise one or more servers and/or one or more cloud computing devices, and the like, configured to communicate with the first PTT device 110 and the other PTT devices 112.

As depicted, the server 120 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

The server 120 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the first PTT device 110 and/or the other PTT devices 112. For example, the communication unit 202 may include one or more transceivers 208 and/or wireless transceivers for communicating with the first PTT device 110 and/or the other PTT devices 112. Hence, the one or more transceivers 208 may be adapted for communication with one or more communication networks used to communicate with the first PTT device 110 and/or the other PTT devices 112. For example, the one or more transceivers 208 may be adapted for communication with one or more of a narrow band network such as a Land Mobile Radio (LMR) network, and the like, and a broadband network such as a Long Term Evolution (LTE) network, the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, an LMR transceiver, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the server 120 is not a generic controller and/or a generic device, but a device specifically configured to implement functionality for emergency audio transmission. For example, in some examples, the server 120 and/or the controller 220 specifically comprises a computer executable engine configured to implement functionality for emergency audio transmission.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the server 120 as described herein are maintained, persistently, at the memory 222 and used by the controller 220 which makes appropriate utilization of volatile storage during the execution of such programming instructions.

As depicted, the memory 222 further stores an emergency audio transmission routing module 224 and a PTT device registration module 225, which may be used by the server 120 and/or the controller 220 while implementing the application 223.

Figure 4:
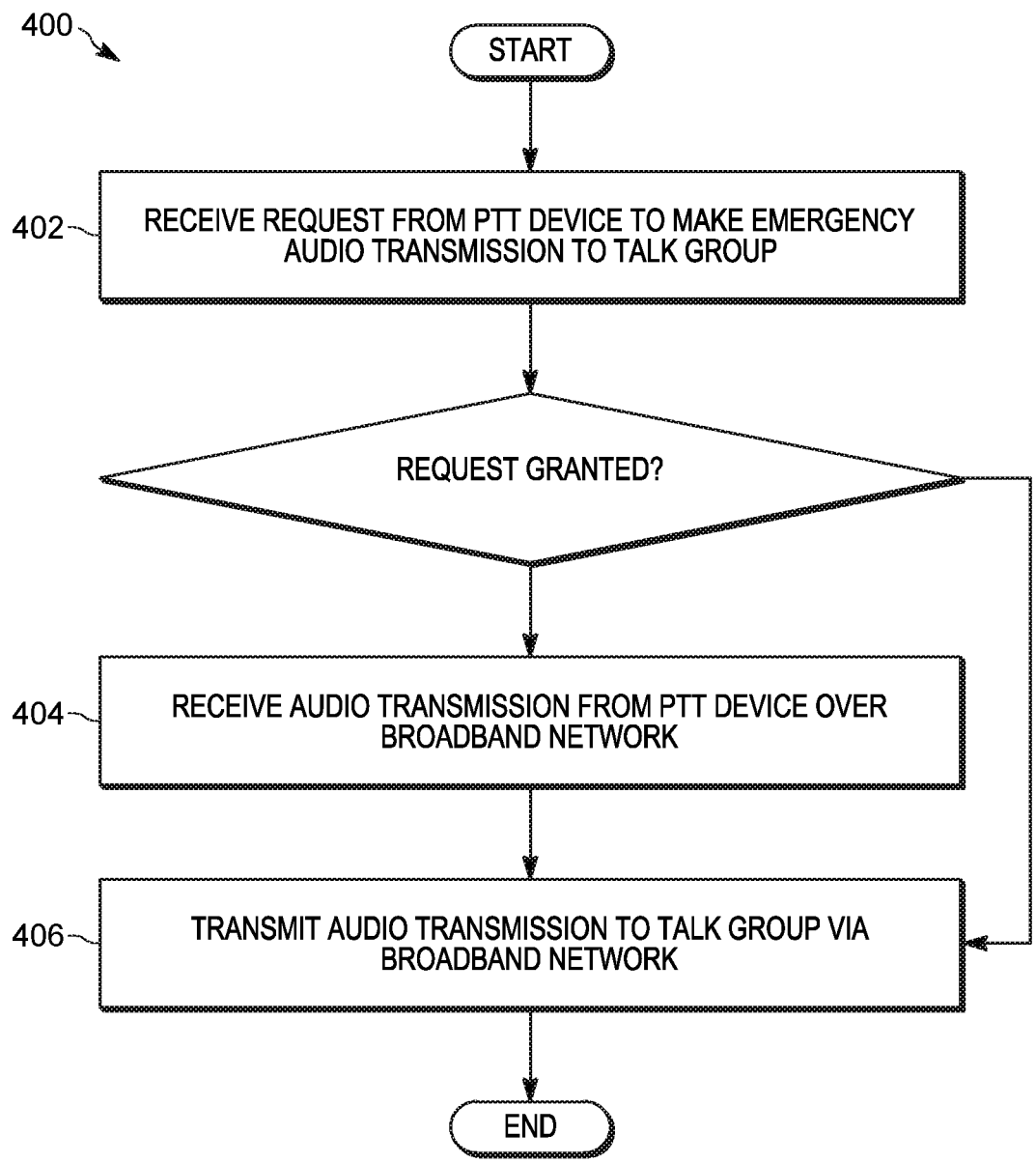
FIG. 4 is a flowchart of a method for emergency audio transmission at a server, in accordance with some examples.

In particular, the memory 222 stores instructions corresponding to the at least one application 223 (and which may include emergency audio transmission routing module 224 and PTT device registration module 225) that, when executed by the controller 220, enables the controller 220 to implement functionality for emergency audio transmission including, but not limited to, the blocks of the method set forth in FIG. 4.

In illustrated examples, when the controller 220 executes the one or more applications 223, the controller 220 is enabled to: receive, over a broadband network 104, a request 124 to make an emergency audio transmission 126 to a talk group, the request 124 received from a first push-to-talk (PTT) device 110 communicatively connected with the talk group over a narrow band network 102 at which a second PTT device 112-2 of the talk group has floor control; in response to granting the request 124, receive, from the first PTT device 110, an emergency audio transmission 126 over the broadband network; and transmit, to the talk group, the emergency audio transmission 126 via the broadband network 104.

In some examples, the controller 220 executing the application 223 may use the emergency audio transmission routing module 224 to, prior to receiving the request 124 to make the emergency audio transmission 126, receive, from the first PTT device 110, an initial request 122 to communicate to the talk group over the narrow band network 102, and transmit, to the first PTT device 110, a rejection to communicate to the talk group over the narrow band network 102. That is, the controller 220 executing the application 223 may use the emergency audio transmission routing module 224 to determine whether to grant permission to the first PTT device 110 to make the emergency audio transmission 126. The determination may be based on factors such as whether the first PTT device 110 is registered to make emergency audio transmissions, a limitation enforced on the use of emergency audio transmissions, or other factors.

The controller 220 executing the application 223 may use the emergency audio transmission routing module 224 to enforce a limitation on how the first PTT device 110 may make the emergency audio transmission 126 to the talk group over the broadband network 104, for example, by limiting how often, how frequently, and/or for how long, an emergency audio transmission 126 may be made to the talk group. That is, the limitation may include a limit to a number of emergency audio transmissions the first PTT device 110 is permitted to make within a period of time, and/or a limit to a duration of the emergency audio transmission 126. The limitation may be progressive, either in the duration or frequency permitted. As one example, when the first PTT device 110 first makes an emergency audio transmission 126, the PTT device 110 may be permitted to transmit for a duration of 30 seconds; when the first PTT device 110 makes an additional emergency audio transmission 126 within a pre-determined period of time (e.g. 24 hours, or shift), the first PTT device 110 may be permitted to transmit for a duration of only 20 seconds; and so on. As another example, when the first PTT device 110 makes a number of emergency audio transmissions 126 within a pre-determined period of time that exceeds a first threshold (e.g. 3 emergency audio transmissions within 24 hours, and/or a shift), the first PTT device 110 may be blocked from making a number of emergency audio transmissions that exceeds a second threshold (e.g. 1 emergency audio transmission within 24 hours, or a shift) during the next cycle. The server 120 may determine whether to grant permission to the first PTT device 110 to make an emergency audio transmission 126 based on such limitations. Thus, the transmission of emergency audio transmissions 126 may be restricted so as to prevent excessive use.

Further, the controller 220 executing the application 223 may use the PTT device registration module 225 to register the first PTT device 110 to communicatively connect with the talk group over the broadband network 104, and to flag the first PTT device 110 as permitted to transmit audio to the talk group over the broadband network 104 when granted the request 124 to make the emergency audio transmission 126. That is, the server 120 stores an indication that the first PTT device 110 may use the broadband network 104 for emergency audio transmissions 126, and otherwise would use the narrow band network 102 for ordinary audio transmissions. In other words, the flag ensures that ordinary audio transmissions from the first PTT device 110 are made over the narrow band network 102 rather than the broadband network 104, and that the broadband network 104 is reserved for emergency audio transmissions 126. In some examples, a flag that the first PTT device 110 is to transmit emergency audio transmissions over the broadband network 104 also indicates that the first PTT device 110 is to receive emergency audio transmissions over the broadband network 104. Similarly, where another PTT device 112 is registered to the broadband network 104 with such a flag, then the server 120 is to transmit emergency audio transmissions to the PTT device 112 over the broadband network 104. On the other hand, if a PTT device 112 is registered on the broadband network 104 without such a flag, such as when the broadband network 104 is the only communication network by which the PTT device 112 may communicate with the talk group, all audio transmissions, including ordinary audio transmissions transmitted to the server 120 over the narrow band network 102 and emergency audio transmissions transmitted over the broadband network 104, may be transmitted to the PTT device 112 over the broadband network 104. Similarly, if a PTT device 112 is registered on the broadband network 104 without such a flag, requests to transmit audio from the PTT device 112 to the talk group may be treated as if they were requests coming made via the narrow band network 102.

As discussed above, when an emergency audio transmission 126 is transmitted while another PTT device with floor control is transmitting, both audio streams are outputted at the other receiving PTT devices. Audio streams from the narrow band network 102 and the broadband network 104 may be outputted through the same speakers or different speakers. Such a form of audio transmission may be termed a "barge call", that is, a call which is provided to the talk group while another PTT device of the talk group has floor control. The barge call is provided over the broadband network 104.

Figure 3:
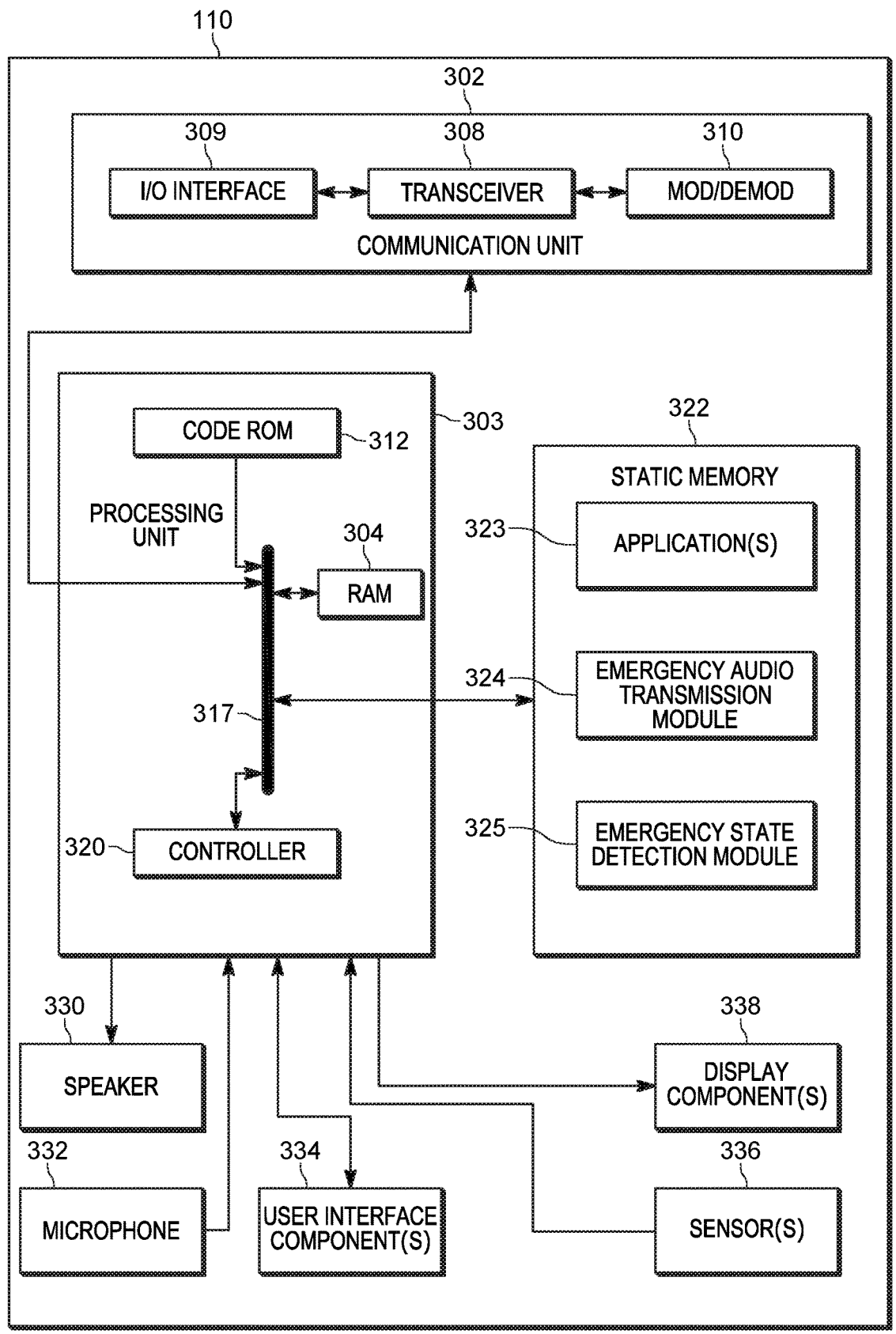
FIG. 3 is a device diagram showing a device structure of a push-to-talk (PTT) device for emergency audio transmission, in accordance with some examples.

Attention is next directed to FIG. 3, which is a device diagram of an example first PTT device 110 of FIG. 1. The first PTT device 110 is similar to the server 120, with like components numbered in the "300" series rather than the "200" series, and therefore includes a communication unit 302, a processing unit 303, a Random-Access Memory (RAM) 304, one or more wireless transceivers 308, one or more wired and/or wireless input/output (I/O) interfaces 309, a combined modulator/demodulator 310, a code Read Only Memory (ROM) 312, a common data and address bus 317, a controller 320, and a static memory 322 storing at least one application 323. For further description of the above components, description of the like components of the server 120 of FIG. 2 may be referenced. However, the components of the first PTT device 110 that are similar to components of the server 120 are understood to be adapted for functionality of the first PTT device 110, as described herein.

In contrast to the server 120 of FIG. 2, the first PTT device 110 includes audio interface components including one or more speaker 330 and microphone 332, user interface component(s) 334, display component(s) 338, and sensor(s) 336. The speaker 330 is for a user of the first PTT device 110 to hear audio transmissions from a talk group with which the first PTT device 110 is communicatively connected, including emergency audio transmissions 126, or other audio outputs. In some examples, the first PTT device 110 may include separate speakers to output ordinary audio transmissions received over a narrow band network 102 and emergency audio transmissions 126 received over a broadband network 104. The microphone 332 captures audio speech from a user of the first PTT device 110 for transmission to a talk group, or other audio inputs. The user interface component(s) 334 may include one or more of a knob, button, switch, touch screen, or other user interface components for a user of the first PTT device 110 to manipulate to operate the first PTT device 110, including, for example, a push-to-talk button, volume knob, or channel knob. The user interface component(s) 334 may include an emergency button which a user of the first PTT device 110 may press to indicate an emergency situation. The display component(s) 338 may include one or more of a display screen and indicator light. The sensor(s) 336 may include one or more of a locating device (e.g. GPS), accelerometer, gyroscope, a man-down detector, holster detector, and microphone.

Further, the first PTT device 110 may store in the memory 322 an emergency audio transmission module 324 and an emergency state detection module 325, which may be used by the first PTT device 110 and/or the controller 320 while implementing the application 323.

Figure 5:
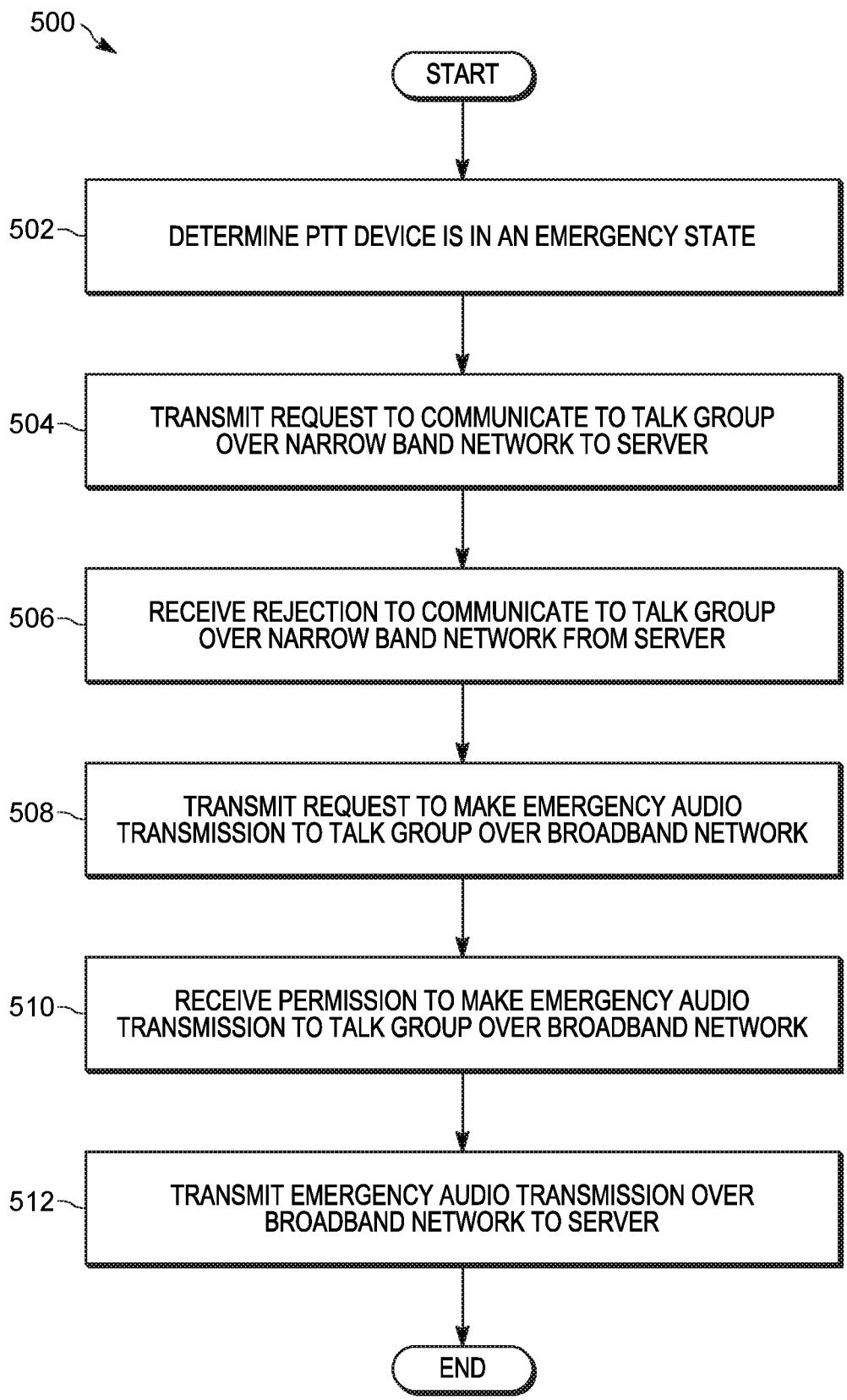
FIG. 5 is a flowchart of a method for emergency audio transmission at a PTT device, in accordance with some examples.

In particular, the memory 322 stores instructions corresponding to the at least one application 323 (and which may include the emergency audio transmission module 324 and emergency state detection module 325) that, when executed by the controller 320, enables the controller 320 to implement functionality for emergency audio transmission 126 including, but not limited to, the blocks of the method set forth in FIG. 5.

In illustrated examples, when the controller 320 executes the one or more applications 323, the controller 320 is enabled to determine that the PTT device 110 is in an emergency state; transmit, to a server 120, a first request 122 to communicate to the talk group over the narrow band network 102; receive a rejection to communicate to the talk group over the narrow band network 102; transmit, to the server 120, a second request 124 to make an emergency audio transmission 126 to the talk group over a broadband network 104; receive permission to make the emergency audio transmission 126 to the talk group over the broadband network 104; and transmit, to the server 120, the emergency audio transmission 126 over the broadband network 104.

The controller 320 executing the application 323 may use the emergency audio transmission module 324 to register the PTT device 110 at the server 120 to communicatively connect with the talk group over the narrow band network 102, and register the PTT device 110 at the server 120 to communicatively connect with the talk group over the broadband network 104 to transmit emergency audio transmissions 126. That is, the PTT device 110 may request that the server 120 route emergency audio transmissions 126 from the PTT device 110 over the broadband network 104, and to otherwise route ordinary audio transmissions from the PTT device 110 over the narrow band network 102.

Further, the controller 320 executing the application 323 may use the emergency audio transmission module 324 to, in response to receiving permission to make the emergency audio transmission 126, provide a notification at the PTT device 110 that the permission was received. The notification may include one or more of an audio notification (e.g. through speaker 330), a visual notification (e.g. through display component(s) 338), illumination of a light of the PTT device (e.g. emergency indicator light), and a displayed notification at a display screen of the PTT device 110. Thus, the user of the PTT device 110 may be made aware that the PTT device 110 is in an emergency state and capable of transmitting an emergency audio transmission 126 over the broadband network 104.

Further, the controller 320 executing the application 323 may use the emergency state detection module 325 to determine that the PTT device 110 is in an emergency state. It may be determined that the PTT device 110 is in an emergency state by one or more of receiving an input at an emergency button of the PTT device 110 (e.g. a user interface component 334), detecting a noise at the PTT device 110 indicative of an emergency (e.g. through the microphone 332), and detecting motion of the PTT device 110 indicative of an emergency (e.g. through a sensor 336 such as an accelerometer), or by another trigger that indicates an emergency. Thus, the emergency state detection module 325 may include logic to determine whether the PTT device 110 is in an emergency state based on any such inputs.

Further, the controller 320 executing the application 323 may use the emergency audio transmission module 324 to limit emergency audio transmissions from the PTT device 110. Emergency audio transmissions 126 from the PTT device 110 may be limited by limiting how often, how frequently, and/or for how long, an emergency audio transmission 126 may be made from the PTT device 110. For example, the emergency audio transmission module 324 may cease transmission of the emergency audio transmission 126 from the PTT device 110 after a predetermined duration.

While the details of the other PTT devices 112 are not depicted, the other PTT devices 112 may have similar components to the first PTT device 110.

Attention is next directed to FIG. 4, which is a flowchart representative of a method 400 for emergency audio transmission. The operations of the method 400 of FIG. 4 correspond to machine readable instructions that are executed by the server 120, and specifically the controller 220 of the server 120. In the illustrated example, the instructions represented by the blocks of FIG. 4 are stored at the memory 222 for example, as the application 223. The method 400 of FIG. 4 is one way in which the controller 220 and/or the server 120 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the components of method 400 are referred to herein as "blocks" rather than "steps." The method 400 of FIG. 4 may be implemented on variations of the system 100 of FIG. 1, as well.

At block 402, a request 124 is received, at the server 120 and/or the controller 220, over the broadband network 104, to make an emergency audio transmission 126 to a talk group. The request 124 is received from the first PTT device 110, which is communicatively connected with the talk group over the narrow band network 102, and at which a second PTT device (e.g. the other PTT device 112-2) of the talk group has floor control.

At block 404, in response to the server 120 and/or the controller 220 granting the request 124, an audio transmission (e.g. emergency audio transmission 126) is received, at the server 120 and/or the controller 220, over the broadband network 104.

At block 406, the audio transmission (e.g. emergency audio transmission 126) is transmitted, from the server 120 and/or the controller 220 to the talk group. For example, when an audio transmission is transmitted to the talk group, the other PTT devices 112 receive the audio transmission, and may output the audio transmission through a speaker or other output device.

The method 400 may further involve, prior to receiving the request 124, registering, at the server 120 and/or the controller 220, the first PTT device 110 to communicatively connect with the talk group over the broadband network 104, and flagging the first PTT device 110 as permitted to transmit audio to the talk group over the broadband network 104 when granted the request 124 to make the emergency audio transmission 126. For example, flagging the first PTT device 110 may involve storing a flag in the memory 222. That is, the memory 222 may store an indication that the first PTT device 110 may use the broadband network 104 for emergency audio transmissions 126, and otherwise would use the narrow band network 102 for ordinary audio transmissions.

Further, the method 400 may involve, prior to receiving the request 124 to make the emergency audio transmission 126, receiving, at the server 120 and/or the controller 220, from the first PTT device 110, an initial request 122 to communicate to the talk group over the narrow band network 102, and transmitting, from the server 120 and/or the controller 220, to the first PTT device 110, a rejection to communicate to the talk group over the narrow band network 102. That is, an initial request 122 to communicate over the narrow band network 102 is denied, which may be based on floor control. However, the emergency audio transmission 126 may be transmitted to the talk group as a barge call. That is, a call which is provided to the talk group while another PTT device 112-2 of the talk group has floor control. Thus, the PTT device 112-2 with floor control need not be blocked from transmitting, but rather, the emergency audio transmission 126 may be broadcast on top of the ordinary audio from the PTT device 112-2 which has floor control.

The method 400 may further involve enforcing at the server 120 and/or the controller 220, a limitation on how the first PTT device 110 may make the emergency audio transmission 126 to the talk group over the broadband network 104. For example, the limitation may include one or more of: a limit to a number of emergency audio transmissions the first PTT device 110 is permitted to make within a period of time, and a limit to a duration of the emergency audio transmission 126. For example, the first PTT device 110 may be permitted to make no more than one emergency audio transmission 126 per day. Accordingly, the server 120 may store a count of the number of emergency audio transmissions 126 transmitted by the first PTT device 110 per time period, and may further store a threshold number of emergency audio transmissions 126 the first PTT device 110 is permitted to transmit per time period, and may refuse to grant a request 124 to make an emergency audio transmission 126 when the threshold is reached. As another example, the duration of an emergency audio transmission 126 may be limited to twenty seconds, and/or any other suitable duration. Accordingly, the server 120 may track the duration of emergency audio transmission 126, and may further store a threshold duration that the first PTT device 110 is permitted to make, and may cease transmission of the emergency audio transmission 126 to the talk group when the emergency audio transmission 126 exceeds the threshold. Thus, excessive use of the option to send emergency audio transmissions 126 may be controlled.

Attention is next directed to FIG. 5, which is a flowchart representative of a method 500 for emergency audio transmission. The operations of the method 500 of FIG. 5 correspond to machine readable instructions that are executed by the PTT device 110, and specifically the controller 320 of the PTT device 110. In the illustrated example, the instructions represented by the blocks of FIG. 5 are stored at the memory 322 for example, as the application 323. The method 500 of FIG. 5 is one way in which the controller 320 and/or the PTT device 110 and/or the system 100 may be configured. Furthermore, the following discussion of the method 500 of FIG. 5 will lead to a further understanding of the system 100, and its various components.

The method 500 of FIG. 5 need not be performed in the exact sequence as shown and likewise various blocks may be performed in parallel rather than in sequence. Accordingly, the components of method 500 are referred to herein as "blocks" rather than "steps." The method 500 of FIG. 5 may be implemented on variations of the system 100 of FIG. 1, as well.

At block 502, it is determined, at the PTT device 110 communicatively connected to the talk group over the narrow band network 102, that the PTT device 110 is in an emergency state. The controller 320 of the PTT device 110 executing the emergency state detection module 325 may recognize certain indications as indicating that the PTT device 110 is in an emergency state. For example, the controller 320 executing the emergency state detection module 325 may interpret an input at an emergency button of the PTT device 110, which may be received when pressed by a user of the PTT device 110, to indicate an emergency state. As another example, the controller 320 executing the emergency state detection module 325 may recognize audio that is indicative of emergency situations. A noise from a gunshot or other noise indicative of an emergency may be recorded by the microphone 332 at the PTT device 110, and interpreted by the controller 320 using the emergency state detection module 325 to determine that the PTT device 110 is in an emergency state. As another example, the controller 320 executing the emergency state detection module 325 may recognize indications of motion that are indicative of emergency situations. A man-down detector of the PTT device 110 may detect motion of the PTT device 110 that indicates that the user of the PTT device 110 may have fallen and is likely to be in an emergency situation. As yet another example, the controller 320 executing the emergency state detection module 325 may interpret that a holster detector of the PTT device 110 detecting that a firearm of the user of the PTT device 110 has been withdrawn is indicative of an emergency situation. As yet another example, the server 120 may instruct the PTT device 110 to enter an emergency state (e.g. based on a location of the PTT device 110 and/or a decision by a dispatcher having control of the server 120).

At block 504, a first request 122 to communicate to the talk group over the narrow band network 102 is transmitted from the PTT device 110 to the server 120. That is, the user of the PTT device 110 presses the push-to-talk button of the PTT device 110 to cause the PTT device 110 to transmit an initial request 122 to transmit an ordinary audio transmission to the talk group.

At block 506, a rejection to communicate to the talk group over the narrow band network 102 is received at the PTT device 110. For example, the other PTT device 112-2 has floor control, and thus the PTT device 110 is blocked from transmitting over the narrow band network 102.

At block 508, a second request (e.g. emergency request 124) to make an emergency audio transmission 126 to the talk group is transmitted over the broadband network 104.

At block 510, permission to make the emergency audio transmission 126 over the broadband network 104 is received at the PTT device 110. The method 500 may involve the PTT device 110, in response to receiving permission to make the emergency audio transmission 126, providing a notification that the permission was received. Such a notification may include one or more of an audio notification, a visual notification, illumination of a light of the PTT device 110, and a displayed notification at a display screen of the PTT device 110.

At block 512, the emergency audio transmission 126 is transmitted from the PTT device 110 to the server 120 over the broadband network 104. The emergency audio transmission 126 may then be transmitted by the server 120 to the other PTT devices 112 over the broadband network 104.

The method 500 may involve the PTT device 110 requesting registration of the PTT device 110 at the server 120 to communicatively connect with the talk group over the narrow band network 102, and further registering the PTT device 110 at the server 120 to communicatively connect with the talk group over the broadband network 104 to transmit emergency audio transmissions 126. Thus, the PTT device 110 may be registered to use the narrow band network 102 for ordinary audio transmissions to the talk group, and registered to use the broadband network 104 for emergency audio transmissions. In some examples, the method 500 may further involve registering the PTT device 110 to receive emergency audio transmission 126 over the broadband network 104. As discussed above, the PTT device 110 may be registered with a flag to indicate not only that the PTT device 110 is to use the broadband network 104 to transmit emergency audio transmission, but also is to use the broadband network 104 to receive emergency audio transmissions.

The method 500 may further involve limiting emergency audio transmissions 126 from the PTT device 110. That is, emergency audio transmissions 126 from the PTT device 110 may be limited by limiting how often, how frequently, and/or for how long, an emergency audio transmission may be made from the PTT device 110. For example, the method 500 may involve the PTT device 110 ceasing transmission of the emergency audio transmission 126 from the PTT device 110 after a predetermined duration. That is, the memory 322 may store a threshold duration for which the first PTT device 110 is permitted to transmit an emergency audio transmission 126, and the controller 320 executing the emergency audio transmission module 324 may cease transmission of the emergency audio transmission 126 from the first PTT device 110 when the threshold duration is reached.

Figure 6:
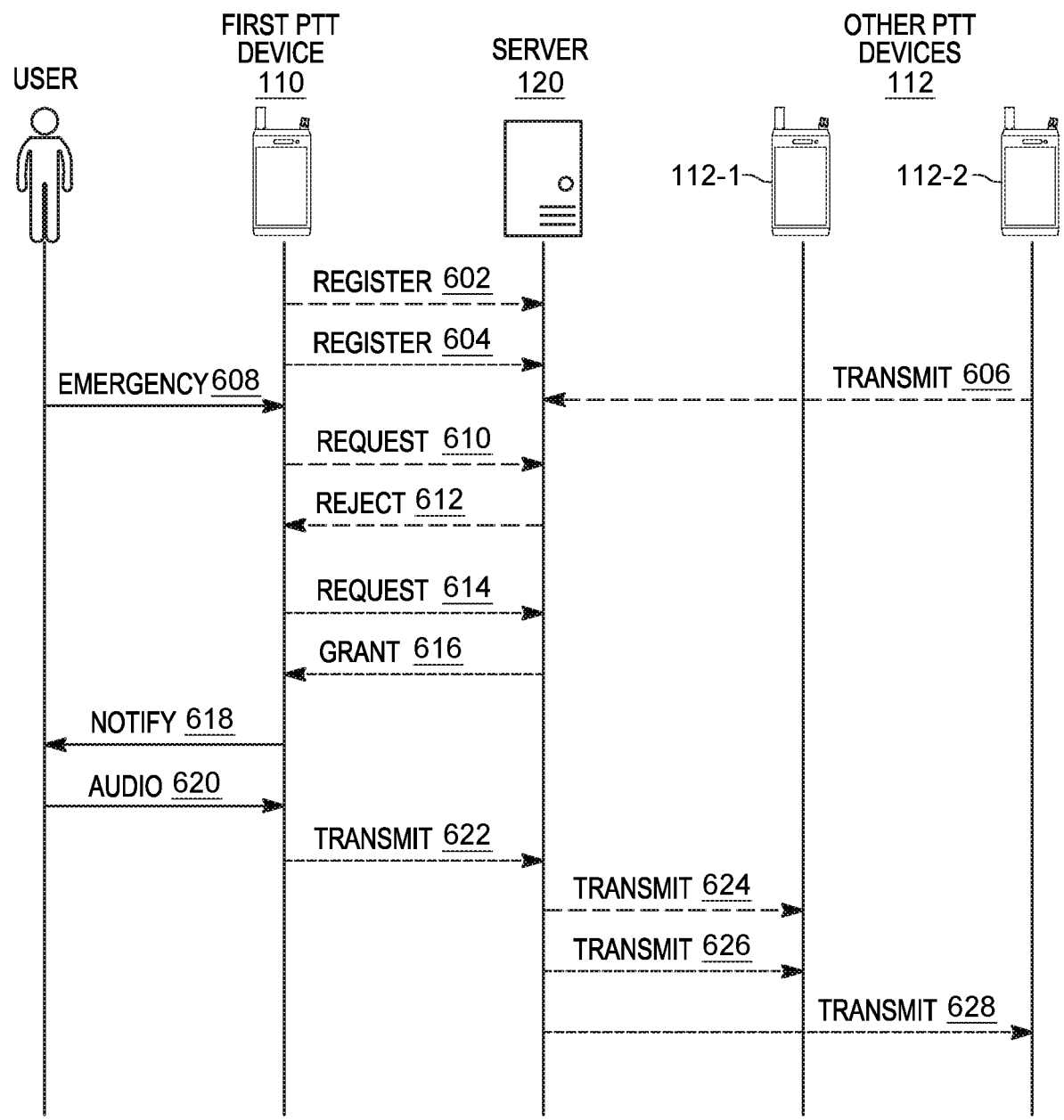
FIG. 6 depicts a flow diagram of a method for emergency audio transmission implemented in the system of FIG. 1, in accordance with some examples.

Attention is next directed to FIG. 6, which depicts a flow diagram of an example of the system 100 implementing a method for emergency audio transmission which may be similar to the method 400 of FIG. 4 and/or the method 500 of FIG. 5. As depicted, a user operates the first PTT device 110, which is communicatively connected with a talk group with which the other PTT devices 112 (herein shown as PTT devices 112-1 and 112-2) are also communicatively connected. The server 120 facilitates communication over a narrow band network (shown in dashed lines) and a broadband network (shown in dotted lines).

The first PTT device 110 registers 602 at the server 120 to communicate with the talk group over the narrow band network 102. The first PTT device 110 registers 604 at the server 120 to communicate with the talk group over the broadband network 104 as an emergency backup. Although not shown, it is understood that the other PTT devices 112 are registered to communicate with the talk group over the narrow band network 102, and that the PTT devices 112 are registered to make emergency communications to the talk group over the broadband network 104, as the first PTT device 110 is.

The other PTT device 112-2 transmits 606 audio to the talk group over the narrow band network 102. Thus, the PTT device 112-2 has floor control of the talk group.

The PTT device 110 is placed in an emergency state 608. For example, the user may press a button which places the first PTT device 110 into the emergency state, or the PTT device 110 may detect another trigger (sound, movement) that the controller 320 executing the emergency state detection module 325 interprets as indicating that the PTT device 110 in an emergency state.

The PTT device 110 transmits 610 a request 122 to the server 120 to transmit audio over the narrow band network 102. The request 122 may include an indication that the PTT device 110 is in an emergency state.

Since the other PTT device 112-2 has floor control, the server 120 transmits 612 a rejection to the first PTT device 110, denying permission to transmit over the narrow band network 102. Alternatively, if no other PTT device 112 has floor control, the PTT device 110 may be permitted to transmit audio over the narrow band network 102.

The first PTT device 110 transmits 614 a request 124 to the server 120 to transmit audio over the broadband network 104. Again, the request 124 may include an indication that the first PTT device 110 is in an emergency state.

The server 120 grants 616 permission to the first PTT device 110 to transmit audio over the broadband network 104. Permission may have been granted based on the first PTT device 110 being registered (i.e. "flagged") for emergency backup communications over the broadband network 104. Permission may also have been granted based on a limitation to make emergency requests not being applied to the present request. In other words, permission to make an emergency audio transmission over the broadband network 104 may be conditional based on whether a limitation has been reached.

The first PTT device 110 notifies 618 the user that permission to transmit audio over the broadband network 104 is granted, e.g. by a notification light, sound, or display.

The user provides audio 620 for transmission over the broadband network 104, e.g., by speaking into a microphone at the first PTT device 110.

The first PTT device 110 transmits 622 the audio transmission over the broadband network 104 to the server 120. The audio is an emergency audio transmission 126.

The server 120 transmits 624, over the narrow band network 102, audio being transmitted by the other PTT device 112-2 that has floor control. Simultaneously, the server 120 transmits 626, over the broadband network 104, the emergency audio transmission 126 transmitted from the first PTT device 110 over the broadband network 104, to the other PTT device 112-1. Similarly, simultaneously, the server 120 transmits 628, over the broadband network 104, the emergency audio transmission 126 transmitted from the first PTT device 110 over the broadband network 104, to the other PTT device 112-2 that has floor control. That is, the server 120 transmits the emergency audio notification to both other PTT devices 112-1, 112-2, while the server 120 continues to transmit the ordinary audio from the other PTT device 112-2 to the talk group.

Thus, the PTT device 110 is provided with the ability to make an emergency audio transmission to a talk group over a broadband network, while the talk group maintains the aspect of floor control over the narrow band network to provide a degree of order to the communication platform. The systems and devices described herein may be particularly useful to first responders, such as law enforcement officers and medical first responders, who may use PTT devices to communicate on a routine basis, but may benefit from the ability to override floor control to communicate emergency information.

In some examples, the system 100 of FIG. 1, the method 400 of FIG. 4, and the method 500 of FIG. 5, and the devices described therein, may be adapted for non-emergency audio transmissions. In such examples, an audio transmission may be important, urgent, high priority, or otherwise appropriate to override floor control of a talk group.

Thus, another aspect of the present specification provides a method for audio transmission at a server. The method comprises: receiving, at a server, over a broadband network, a request to make an audio transmission to a talk group, the request received from a first push-to-talk (PTT) device communicatively connected with the talk group over a narrow band network at which a second PTT device of the talk group has floor control; in response to granting the request, receiving, at the server, from the first PTT device, the audio transmission over the broadband network; and transmitting, from the server to the talk group, the audio transmission via the broadband network.

Another aspect of the present specification provides a method for audio transmission at a PTT device. The method comprises: determining, at a push-to-talk (PTT) device communicatively connected to a talk group over a narrow band network, that the PTT device is in a priority state; transmitting, from the PTT device to a server, a first request to communicate to the talk group over the narrow band network; receiving, at the PTT device, a rejection to communicate to the talk group over the narrow band network; transmitting, from the PTT device to the server, a second request to make an audio transmission to the talk group over a broadband network; receiving, at the PTT device, permission to make the audio transmission to the talk group over the broadband network; and transmitting, from the PTT device to the server, the audio transmission over the broadband network.

Another aspect of the present specification provides a server for audio transmission. The server comprises: a communication unit; and a controller configured to: receive, over a broadband network, a request to make an audio transmission to a talk group, the request received from a first push-to-talk (PTT) device communicatively connected with the talk group over a narrow band network at which a second PTT device of the talk group has floor control; in response to granting the request, receive, from the first PTT device, the audio transmission over the broadband network; and transmit, to the talk group, the audio transmission via the broadband network.

Another aspect of the present specification provides a PTT device for audio transmission. The PTT device comprises: a communication unit communicatively connected to a talk group over a narrow band network; and a controller configured to: determine that the PTT device is in a priority state; transmit, to a server, a first request to communicate to the talk group over the narrow band network; receive a rejection to communicate to the talk group over the narrow band network; transmit, to the server, a second request to make an audio transmission to the talk group over a broadband network; receive permission to make the audio transmission to the talk group over the broadband network; and transmit, to the server, the audio transmission over the broadband network.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
receiving, at a server, over a broadband network, a request to make an emergency audio transmission to a talk group, the request received from a first push-to-talk (PTT) device communicatively connected with the talk group over a narrow band network at which a second PTT device of the talk group has floor control;
in response to granting the request, receiving, at the server, from the first PTT device, an audio transmission over the broadband network; and
transmitting, from the server to the talk group, the audio transmission via the broadband network.

2. The method of claim 1, further comprising enforcing, at the server, a limitation on how the first PTT device may make the emergency audio transmission to the talk group over the broadband network, wherein the limitation comprises one or more of:
a limit to a number of emergency audio transmissions the first PTT device is permitted to make within a period of time; and
a limit to a duration of the emergency audio transmission.

3. The method of claim 1, further comprising:
registering, at the server, the first PTT device to communicatively connect with the talk group over the broadband network; and
flagging the first PTT device as permitted to transmit audio to the talk group over the broadband network when granted the request to make the emergency audio transmission.

4. The method of claim 1, wherein the emergency audio transmission is transmitted to the talk group as a barge call, the barge call comprising a call which is provided to the talk group while another PTT device of the talk group has floor control.

5. The method of claim 1, further comprising, prior to receiving the request to make the emergency audio transmission:
receiving, at the server, from the first PTT device, an initial request to communicate to the talk group over the narrow band network; and
transmitting, from the server to the first PTT device, a rejection to communicate to the talk group over the narrow band network.

6. A method comprising:
determining, at a push-to-talk (PTT) device communicatively connected to a talk group over a narrow band network, that the PTT device is in an emergency state;
transmitting, from the PTT device to a server, a first request to communicate to the talk group over the narrow band network;
receiving, at the PTT device, a rejection to communicate to the talk group over the narrow band network;
transmitting, from the PTT device to the server, a second request to make an emergency audio transmission to the talk group over a broadband network;
receiving, at the PTT device, permission to make the emergency audio transmission to the talk group over the broadband network; and
transmitting, from the PTT device to the server, the emergency audio transmission over the broadband network.

7. The method of claim 6, wherein determining that the PTT device is in an emergency state comprises one or more of:
receiving an input at an emergency button of the PTT device;
detecting a noise at the PTT device indicative of an emergency; and
detecting motion of the PTT device indicative of an emergency.

8. The method of claim 6, further comprising:
registering the PTT device at the server to communicatively connect with the talk group over the narrow band network; and
registering the PTT device at the server to communicatively connect with the talk group over the broadband network to transmit emergency audio transmissions.

9. The method of claim 6, further comprising, in response to receiving permission to make the emergency audio transmission, providing a notification at the PTT device that the permission was received, the notification comprising one or more of:
an audio notification;
a visual notification;
illumination of a light of the PTT device; and
a displayed notification at a display screen of the PTT device.

10. The method of claim 6, further comprising ceasing transmission of the emergency audio transmission after a predetermined duration.

11. A server comprising:
a communication unit; and a controller configured to:
receive, over a broadband network, a request to make an emergency audio transmission to a talk group, the request received from a first push-to-talk (PTT) device communicatively connected with the talk group over a narrow band network at which a second PTT device of the talk group has floor control;
in response to granting the request, receive, from the first PTT device, an audio transmission over the broadband network; and
transmit, to the talk group, the audio transmission via the broadband network.

12. The server of claim 11, wherein the controller is further configured to:
enforce a limitation on how the first PTT device may make the emergency audio transmission to the talk group over the broadband network, wherein the limitation comprises one or more of:
a limit to a number of emergency audio transmissions the first PTT device is permitted to make within a period of time; and
a limit to a duration of the emergency audio transmission.

13. The server of claim 11, wherein the controller is further configured to:
register the first PTT device to communicatively connect with the talk group over the broadband network; and
flag the first PTT device as permitted to transmit audio to the talk group over the broadband network when granted the request to make the emergency audio transmission.

14. The server of claim 11, wherein the emergency audio transmission is transmitted to the talk group as a barge call, the barge call comprising a call which is provided to the talk group while another PTT device of the talk group has floor control.

15. The server of claim 11, wherein the controller is further configured to, prior to receiving the request to make the emergency audio transmission:
receive, from the first PTT device, an initial request to communicate to the talk group over the narrow band network; and
transmit, to the first PTT device, a rejection to communicate to the talk group over the narrow band network.

16. A push-to-talk (PTT) device comprising:
a communication unit communicatively connected to a talk group over a narrow band network; and
a controller configured to:
determine that the PTT device is in an emergency state;
transmit, to a server, a first request to communicate to the talk group over the narrow band network;
receive a rejection to communicate to the talk group over the narrow band network;
transmit, to the server, a second request to make an emergency audio transmission to the talk group over a broadband network;
receive permission to make the emergency audio transmission to the talk group over the broadband network; and
transmit, to the server, the emergency audio transmission over the broadband network.

17. The PTT device of claim 16, wherein the controller determines that the PTT device is in an emergency state by one or more of:
- receiving an input at an emergency button of the PTT device;
- detecting a noise at the PTT device indicative of an emergency; and
- detecting motion of the PTT device indicative of an emergency.

18. The PTT device of claim 16, wherein the controller is further configured to:
- register the PTT device at the server to communicatively connect with the talk group over the narrow band network; and
- register the PTT device at the server to communicatively connect with the talk group over the broadband network to transmit emergency audio transmissions.

19. The PTT device of claim 16, wherein the controller is further configured to, in response to receiving permission to make the emergency audio transmission:
- provide a notification at the PTT device that the permission was received, the notification comprising one or more of:
  - an audio notification;
  - a visual notification;
  - illumination of a light of the PTT device; and
  - a displayed notification at a display screen of the PTT device.

20. The PTT device of claim 16, wherein the controller is further configured to cease transmission of the emergency audio transmission after a predetermined duration.

* * * * *